(12) United States Patent
Parel et al.

(10) Patent No.: US 12,484,774 B2
(45) Date of Patent: Dec. 2, 2025

(54) SPECTRALLY ADJUSTABLE OCULAR PHOTOSENSITIVITY ANALYZER

(71) Applicant: University of Miami, Miami, FL (US)

(72) Inventors: Jean Marie Parel, Miami, FL (US); Cornelis Rowaan, Miami, FL (US); Alex Gonzalez, Miami, FL (US); Juan Silgado, Miami, FL (US); Mariela C. Aguilar, Miami, FL (US); Yu-Cherng Channing Chang, Miami, FL (US)

(73) Assignee: University of Miami, Miami, FL (US)

( * ) Notice: Subject to any disclaimer, the term of this patent is extended or adjusted under 35 U.S.C. 154(b) by 833 days.

(21) Appl. No.: 17/778,293

(22) PCT Filed: Nov. 19, 2020

(86) PCT No.: PCT/US2020/061336
§ 371 (c)(1),
(2) Date: May 19, 2022

(87) PCT Pub. No.: WO2021/102169
PCT Pub. Date: May 27, 2021

(65) Prior Publication Data
US 2022/0409041 A1    Dec. 29, 2022

Related U.S. Application Data

(60) Provisional application No. 62/939,318, filed on Nov. 22, 2019, provisional application No. 62/938,805, filed on Nov. 21, 2019.

(51) Int. Cl.
*A61B 3/06*       (2006.01)
*A61B 3/00*       (2006.01)
(Continued)

(52) U.S. Cl.
CPC ............ *A61B 3/063* (2013.01); *A61B 3/0008* (2013.01); *A61B 3/0025* (2013.01);
(Continued)

(58) Field of Classification Search
CPC ..... A61B 3/063; A61B 3/0008; A61B 3/0025; A61B 3/0033; A61B 3/0083; A61B 3/14;
(Continued)

(56) References Cited

U.S. PATENT DOCUMENTS

2007/0291229 A1\* 12/2007 Yamaguchi .............. A61B 3/14
                                                          351/221
2011/0019418 A1    1/2011  Sanroma et al.
(Continued)

FOREIGN PATENT DOCUMENTS

WO       2014/048797 A2     4/2014

OTHER PUBLICATIONS

International Search Report and Written Opinion. PCT/US2020/61336. Mailed Mar. 9, 2021. 9 Pages.
(Continued)

*Primary Examiner* — William R Alexander
*Assistant Examiner* — Mackenzi Waddell
(74) *Attorney, Agent, or Firm* — Procopio, Cory, Hargreaves & Savitch LLP

(57) ABSTRACT

Ocular photosensitivity analyzer. In an embodiment, a programmable light source, comprising a plurality of multi-spectra light modules, is configured to emit light according to a lighting condition. For one or a plurality of iterations, the programmable light source is activated to emit the light according to the lighting condition, and collect a response, by a subject, to the emitted light via a sensing system comprising one or more sensors. Between iterations, the
(Continued)

programmable light source may be reconfigured based on the response to determine a visual photosensitivity threshold of the subject.

18 Claims, 5 Drawing Sheets

(51) Int. Cl.
    *A61B 3/14*         (2006.01)
    *A61B 5/00*         (2006.01)
    *A61B 5/0533*      (2021.01)
    *A61B 5/296*       (2021.01)
    *A61B 5/395*       (2021.01)

(52) U.S. Cl.
    CPC .......... *A61B 3/0033* (2013.01); *A61B 3/0083* (2013.01); *A61B 3/14* (2013.01); *A61B 5/0077* (2013.01); *A61B 5/0533* (2013.01); *A61B 5/296* (2021.01); *A61B 5/395* (2021.01); *A61B 5/4824* (2013.01); *A61B 5/7264* (2013.01); *A61B 2576/02* (2013.01)

(58) Field of Classification Search
    CPC ..... A61B 5/0077; A61B 5/0533; A61B 5/296; A61B 5/395; A61B 5/4824; A61B 5/7264; A61B 2576/02; A61B 3/11
    See application file for complete search history.

(56) References Cited

U.S. PATENT DOCUMENTS

| | | | | |
|---|---|---|---|---|
| 2012/0182206 | A1* | 7/2012 | Cok | ................... G02B 27/017 345/8 |
| 2016/0178904 | A1* | 6/2016 | Deleeuw | .............. H04N 13/366 345/8 |
| 2017/0354329 | A1* | 12/2017 | Chung | ................... A61B 3/112 |
| 2018/0161579 | A1* | 6/2018 | Franke | ................ A61B 5/1127 |
| 2018/0177976 | A1 | 6/2018 | Burstein | |

OTHER PUBLICATIONS

Aguilar et al. 'Automated instrument designed to determine visual photosensitivity thresholds.' Biomedical optics express vol. 9,11 5583-5596. Oct. 18, 2018, doi: 10.1364/BOE.9.005583. Abstract, p. 5584 para 4; 5585 para 2;5586 para 3; 5587 para 2,3.

* cited by examiner

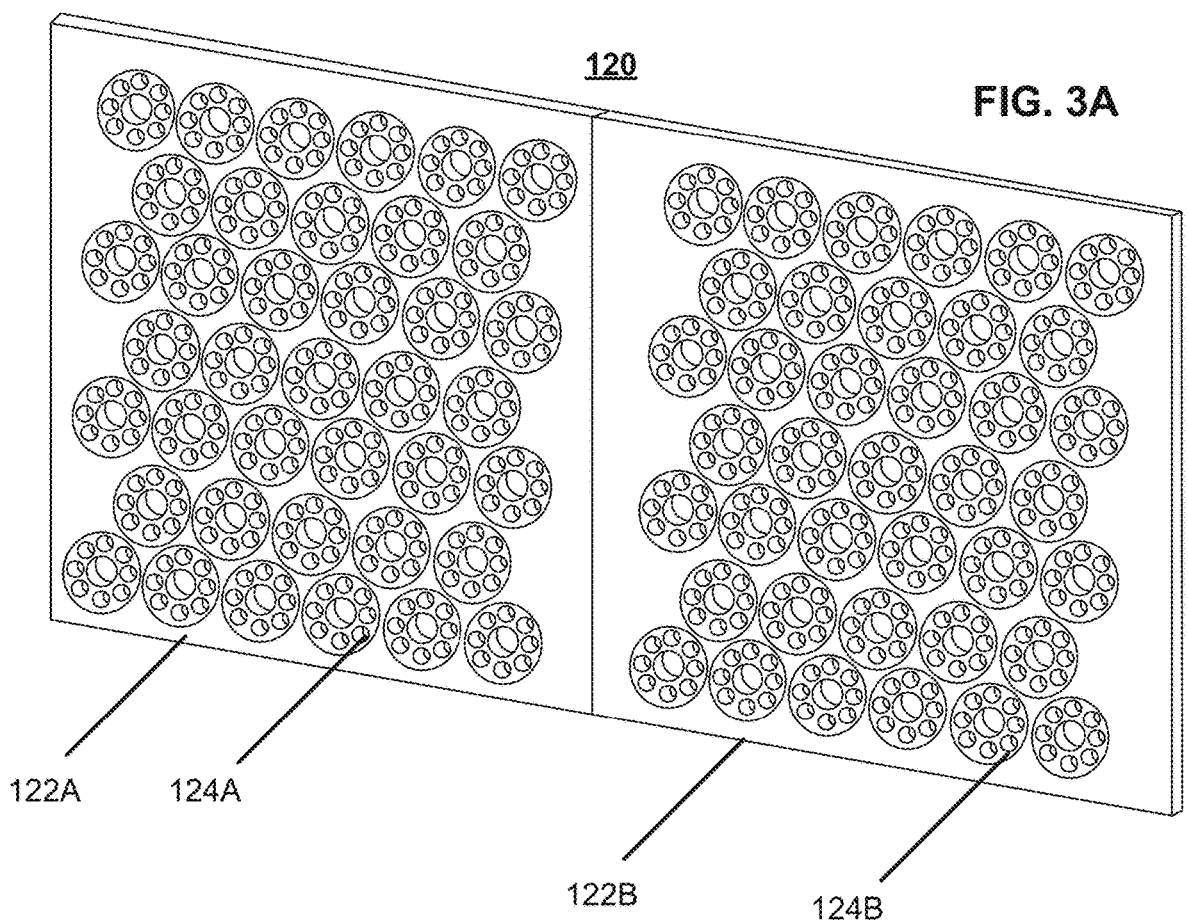
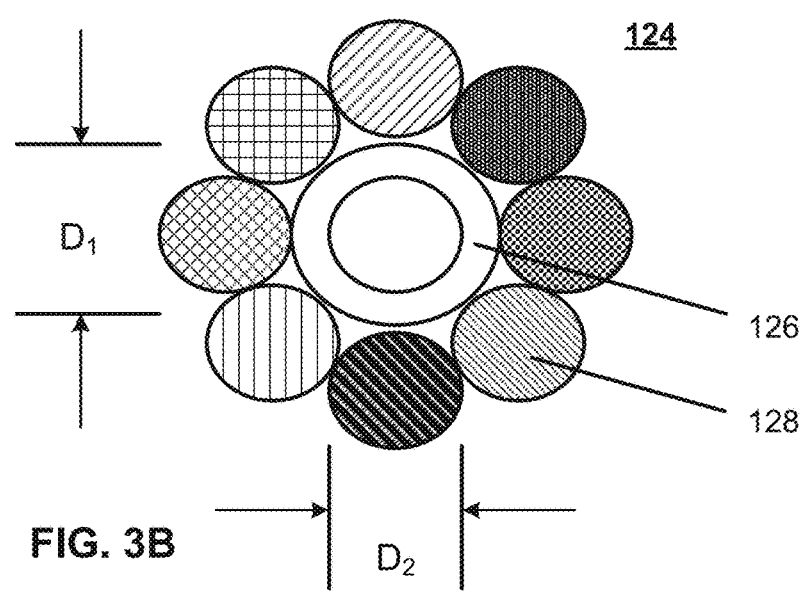

SPECTRALLY ADJUSTABLE OCULAR PHOTOSENSITIVITY ANALYZER

CROSS-REFERENCE TO RELATED APPLICATIONS application is US National Stage of International Patent Application PCT/US2020/31336, filed Nov. 19 2020, which claims priority to U.S. Provisional Patent App. No. 62/938,805, filed on Nov. 21, 2019, and U.S. Provisional Patent App. No. 62/939,318, filed on Nov. 22, 2019, which are hereby incorporated herein by reference as if set forth in full.

BACKGROUND

Field of the Invention

The embodiments described herein are generally directed to ocular photosensitivity analysis, and, more particularly, to an analyzer for measuring a subject's visual photosensitivity threshold (VPT).

Description of the Related Art

The relationship between light spectra and visual photosensitivity is not well understood. What is needed is an ocular photosensitivity analyzer that is capable of quantifying the visual photosensitivity thresholds of subjects.

SUMMARY

Accordingly, an ocular photosensitivity analyzer that, in an embodiment, is capable of quantifiable, reliable, scalable, and comprehensive measurements of visual photosensitivity under varying conditions is disclosed.

In an embodiment, the ocular photosensitivity analyzer comprises: at least one hardware processor; a programmable light source comprising a plurality of multi-spectra light modules configured to emit light at a range of wavelengths; a sensing system comprising one or more sensors; and one or more software modules that are configured to, when executed by the at least one hardware processor, receive an indication of a lighting condition comprising one or more wavelengths of light, configure the programmable light source to emit light according to the lighting condition, and, for each of one or more iterations, activate the programmable light source to emit the light according to the lighting condition, and collect a response, by a subject, to the emitted light via the sensing system.

The programmable light source may comprise two cupola-shaped panels, wherein each of the two cupola-shaped panels comprises a subset of the plurality of multi-spectra light modules, and wherein the subset of multi-spectra light modules in each of the two cupola-shaped panels is concavely arranged to focus the emitted light on a focal point.

Each of the multi-spectra light modules may be modular such that the multi-spectra light module can be inserted at and removed from any of a plurality of positions within the programmable light source.

Each of the multi-spectral light modules may comprise a ring of lights around a center, wherein each of the lights comprises one or more light-emitting diodes.

The one or more sensors may comprise at least one high-definition camera that is configured to capture images of a face of the subject, wherein collecting the response comprises receiving the images captured by the at least one high-definition camera during a time period that includes or follows a time at which the programmable light source was activated. The one or more sensors may comprise at least three high-definition cameras, wherein the at least three high-definition cameras comprise a first high-definition camera configured to capture the images of the face of the subject, a second high-definition camera configured to capture images of a right eye of the subject, and a third high-definition camera configured to capture images of a left eye of the subject.

The one or more sensors may comprise a button that outputs a signal indicating when the button has been pressed.

The one or more sensors may comprise one or more electromyography (EMG) sensors that are each configured to output an EMG signal from one or more muscle groups of the subject.

The one or more sensors may comprise one or more galvanic skin response (GSR) sensors that are each configured to output a GSR signal from the subject.

The one or more software modules may be further configured to, for each of the one or more iterations, after collecting the response, analyze the response to determine whether or not the response represents discomfort or pain. Analyzing the response may comprise applying a machine-learning algorithm, which has been trained to classify responses according to a plurality of classes, to the response to classify the response into one of the plurality of classes, wherein the plurality of classes comprises one or both of a class representing discomfort or a class representing pain. The one or more software modules may be further configured to, for each of the one or more iterations, when determining that the response does not represent discomfort or pain, reconfiguring the programmable light source to emit the light at a higher intensity, and adding a new iteration to the one or more iterations.

The one or more iterations may be a plurality of iterations, and the one or more software modules may be further configured to: for each of the plurality of iterations, after collecting the response, analyze the response, and reconfigure the programmable light source based on the analysis and a stimuli algorithm; and determine a visual photosensitivity threshold of the subject based on the analysis in at least a last one of the plurality of iterations. The stimuli algorithm may implement a staircase such that, in each of the plurality of iterations, reconfiguring the programmable light source comprises adjusting an intensity of the light to be emitted by the programmable light source by a step size from the intensity of the light most recently emitted by the programmable light source. The stimuli algorithm may comprise adjusting the step size based on the collected responses.

The analyzer may further comprise a positioning system comprising one or both of a chin rest and a forehead rest, wherein the positioning system is positioned relative to the programmable light source to seat a head of the subject such that each eye of the subject is positioned at a focal point of the programmable light source.

The sensing system may comprise at least one camera configured to capture images, wherein the positioning system is motorized, and wherein the one or more software modules are further configured to, in real time: analyze the images captured by the at least one camera to detect a region of interest of the subject in the images; and control one or more motors of the positioning system to center the region of interest within the images captured by the at least one camera.

The analyzer may further comprise an interface with an environmental system comprising one or more ambient light sources, wherein the one or more software modules are further configured to: receive an indication of one of a plurality of illumination ranges via a graphical user interface; and control the one or more ambient light sources via the interface to maintain ambient illumination from the one or more ambient light sources within the indicated illumination range.

The analyzer may further comprise an infrared light source configured to aim infrared light at a face of the subject.

In an embodiment, a method is disclosed for an ocular photosensitivity analyzer that comprises a programmable light source comprising a plurality of multi-spectra light modules configured to emit light at a range of wavelengths, a sensing system comprising one or more sensors, and at least one hardware processor. The method comprises using the at least one hardware processor to: receive an indication of a lighting condition comprising one or more wavelengths of light; configure the programmable light source to emit light according to the lighting condition; and, for each of one or more iterations, activate the programmable light source to emit the light according to the lighting condition, and collect a response, by a subject, to the emitted light via the sensing system.

BRIEF DESCRIPTION OF THE DRAWINGS

The details of the present invention, both as to its structure and operation, may be gleaned in part by study of the accompanying drawings, in which like reference numerals refer to like parts, and in which:

FIGS. 3A and 3B illustrate an example light source, according to an embodiment;

DETAILED DESCRIPTION

In an embodiment, an ocular photosensitivity analyzer is disclosed. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. System Overview

1.1. Ocular Photosensitivity Analyzer

Figure 1:
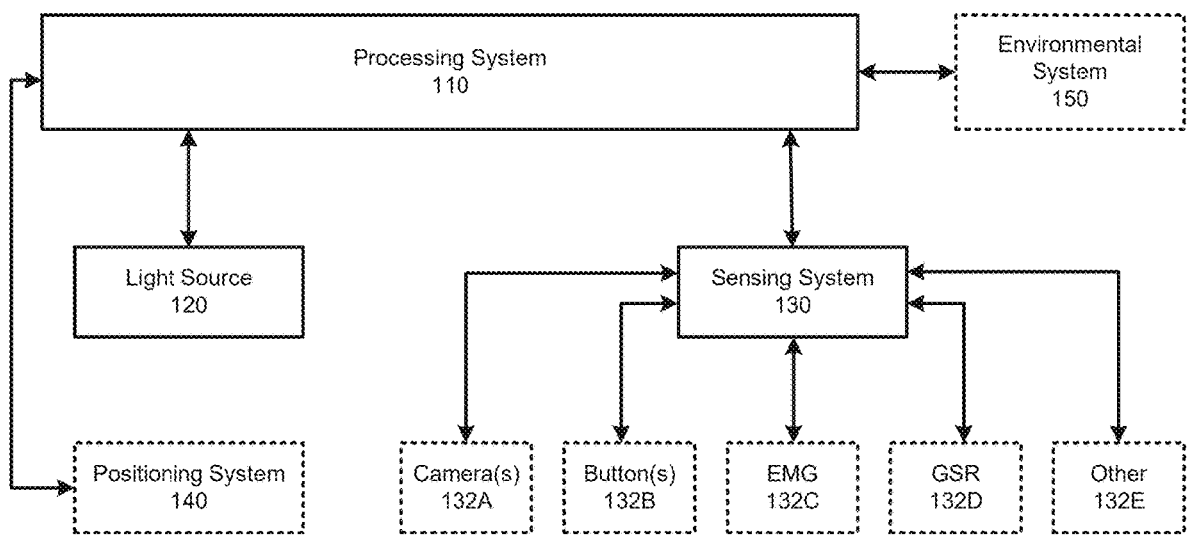
FIG. 1 illustrates an example ocular photosensitivity analyzer, in which one or more of the processes described herein, may be implemented, according to an embodiment.

FIG. 1 illustrates an example ocular photosensitivity analyzer 100 in which one or more of the disclosed processes may be implemented, according to an embodiment. As illustrated, analyzer 100 may comprise a processing system 110, one or more light sources 120, and a sensing system 130 comprising one or more sensors 132. In addition, analyzer 100 may optionally comprise or interface with one or more positioning systems 140 and/or one or more environmental systems 150. Although, processing system 110, light source 120, sensing system 130, positioning system 140, and environmental system 150 may be illustrated and referred to herein in the singular form, it should be understood that this is simply for the sake of simplicity and clarity, and that analyzer 100 may comprise one or a plurality of any one or more and any combination of these components.

1.2 Example Processing System

Figure 2:
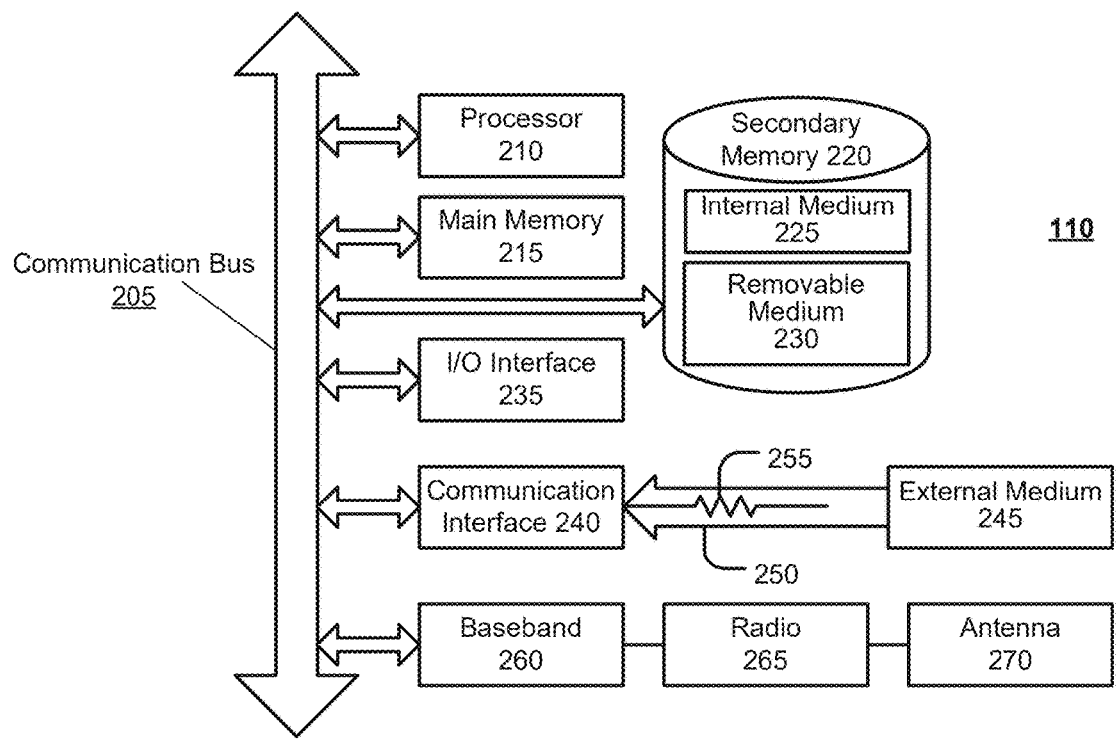
FIG. 2 illustrates an example processing system, by which one or more of the processes described herein, may be executed, according to an embodiment.

FIG. 2 is a block diagram illustrating an example wired or wireless processing system 110 that may be used in analyzer 100, according to an embodiment. For example, system 110 may be used as or in conjunction with one or more of the functions, processes, or methods described herein (e.g., to store and/or execute one or more software modules implementing the disclosed control and analysis). System 110 can be a server, a conventional personal computer, a mobile device (e.g., a smart phone, a wearable device such as smart glasses, etc.), or any other processor-enabled device that is capable of wired or wireless data communication. Other computer systems and/or architectures may be also used, as will be clear to those skilled in the art.

System 110 preferably includes one or more processors, such as processor 210. Additional processors may be provided, such as an auxiliary processor to manage input/output, an auxiliary processor to perform floating-point mathematical operations, a special-purpose microprocessor having an architecture suitable for fast execution of signal-processing algorithms (e.g., digital-signal processor), a slave processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 110 include, without limitation, the Pentium® processor, Core i7® processor, and Xeon® processor, all of which are available from Intel Corporation of Santa Clara, California.

Processor 210 is preferably connected to a communication bus 205. Communication bus 205 may include a data channel for facilitating information transfer between storage and other peripheral components of system 110. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 110 preferably includes a main memory 215 and may also include a secondary memory 220. Main memory 215 provides storage of instructions and data for programs executing on processor 210, such as one or more of the functions and/or modules discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and/or the like.

Secondary memory 220 is a non-transitory computer-readable medium having computer-executable code (e.g., data and one or more software modules implementing the disclosed control and analysis) and/or other data stored thereon. The computer software or data stored on secondary memory 220 is read into main memory 215 for execution by processor 210.

In alternative embodiments, secondary memory 220 may include other similar means for allowing computer programs or other data or instructions to be loaded into system 110. Such means may include, for example, a communication interface 240, which allows software and data to be transferred from external storage medium 245 to system 110. Examples of external storage medium 245 may include an external hard disk drive, an external optical drive, an external magneto-optical drive, and/or the like. Other examples of secondary memory 220 may include semiconductor-based memory, such as programmable read-only memory (PROM), erasable programmable read-only memory (EPROM), electrically erasable read-only memory (EEPROM), and flash memory (block-oriented memory similar to EEPROM).

As mentioned above, system 110 may include a communication interface 240. Communication interface 240 allows software and data to be transferred between system 110 and external devices (e.g. printers), networks, or other information sources. For example, computer software or executable code may be transferred to system 110 from a network server (e.g., platform 110) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 110 with a network (e.g., network(s) 120) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 120), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as one or more software modules implementing the disclosed control and analysis) is stored in main memory 215 and/or secondary memory 220. Computer programs can also be received via communication interface 240 and stored in main memory 215 and/or secondary memory 220. Such computer programs, when executed, enable system 110 to perform the various functions of the disclosed embodiments as described elsewhere herein.

In this description, the term "computer-readable medium" is used to refer to any non-transitory computer-readable storage media used to provide computer-executable code and/or other data to or within system 110. Examples of such media include main memory 215, secondary memory 220 (including internal memory 225, removable medium 230, and external storage medium 245), and any peripheral device communicatively coupled with communication interface 240 (including a network information server or other network device). These non-transitory computer-readable media are means for providing executable code, programming instructions, software, and/or other data to system 110.

In an embodiment that is implemented using software, the software may be stored on a computer-readable medium and loaded into system 110 by way of removable medium 230, I/O interface 235, or communication interface 240. In such an embodiment, the software is loaded into system 110 in the form of electrical communication signals 255. The software, when executed by processor 210, preferably causes processor 210 to perform one or more of the processes and functions described elsewhere herein.

In an embodiment, I/O interface 235 provides an interface between one or more components of system 110 and one or more input and/or output devices. Example input devices include, without limitation, sensors, keyboards, touch screens or other touch-sensitive devices, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., in a smartphone, tablet, or other mobile device).

System 110 may also include optional wireless communication components that facilitate wireless communication over a voice network and/or a data network (e.g., in the case of user system 130). The wireless communication components comprise an antenna system 270, a radio system 265, and a baseband system 260. In system 110, radio frequency (RF) signals are transmitted and received over the air by antenna system 270 under the management of radio system 265.

In an embodiment, antenna system 270 may comprise one or more antennae and one or more multiplexors (not shown) that perform a switching function to provide antenna system 270 with transmit and receive signal paths. In the receive path, received RF signals can be coupled from a multiplexor to a low noise amplifier (not shown) that amplifies the received RF signal and sends the amplified signal to radio system 265.

In an alternative embodiment, radio system 265 may comprise one or more radios that are configured to communicate over various frequencies. In an embodiment, radio system 265 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 265 to baseband system 260.

If the received signal contains audio information, then baseband system 260 decodes the signal and converts it to an analog signal. Then the signal is amplified and sent to a speaker. Baseband system 260 also receives analog audio signals from a microphone. These analog audio signals are converted to digital signals and encoded by baseband system 260. Baseband system 260 also encodes the digital signals for transmission and generates a baseband transmit audio signal that is routed to the modulator portion of radio system 265. The modulator mixes the baseband transmit audio signal with an RF carrier signal, generating an RF transmit signal that is routed to antenna system 270 and may pass through a power amplifier (not shown). The power amplifier amplifies the RF transmit signal and routes it to antenna system 270, where the signal is switched to the antenna port for transmission.

Baseband system 260 is also communicatively coupled with processor 210, which may be a central processing unit (CPU). Processor 210 has access to data storage areas 215 and 220. Processor 210 is preferably configured to execute instructions (i.e., computer programs, such as one or more software modules implementing the disclosed control and analysis) that can be stored in main memory 215 or secondary memory 220. Computer programs can also be received from baseband processor 260 and stored in main memory 210 or in secondary memory 220, or executed upon receipt. Such computer programs, when executed, enable system 110 to perform the various functions of the disclosed embodiments.

1.3. Light Source

FIG. 3A illustrates an example light source 120, according to an embodiment. As illustrated, light source 120 may comprise a plurality of panels 122, such as two panels 122A and 122B. Each panel 122 comprises a plurality of multi-spectra light modules 124. Each of the plurality of multi-spectra light modules 124 (e.g., 124A and 124B) may be identical. Alternatively, one or more of the plurality of multi-spectra light modules 124 could be different than other ones of the plurality of multi-spectra light modules 124. Each of the plurality of multi-spectra light modules 124 may be modular, such that it can be easily inserted, removed, moved, and replaced at any of the plurality of positions within any panel 122.

Each panel 122 of multi-spectra light modules 124 may be configured to illuminate a respective eye of a subject. For example, panels 122A and 122B may be positioned with respect to each other and to a reference point, at which a body part of a subject (e.g., head, eyes, chin, etc.) is expected to be positioned during operation, so as to illuminate the subject's pupils when the subject's body part is positioned at the reference point. In other words, each panel 122 may be positioned to focus light on a region of interest (e.g., pupil) of a specifically positioned subject.

As illustrated in FIG. 3A, panels 122 may be substantially planar or flat and connected to each other in the same plane. However, in an alternative embodiment, panels 122 may be non-planar and/or disconnected from each other. For example, in a preferred embodiment, each panel 122 may be shaped as a cupola or dome with a concave side facing the subject. In this case, the rows or columns of multi-spectra light modules 124 may follow the shape of the respective panel 122 such that, collectively, the plurality of multi-spectra light modules 124 in each panel 122 are concave (e.g., each multi-spectra light module 124 lies in a different plane from every other multi-spectra light module 124). Together, such panels 122A and 122B form a bi-cupola shape which focuses light on two regions of interest (e.g., both pupils) in the subject's eyes.

FIG. 3B illustrates a front view of a single multi-spectra light module 124 in isolation, according to an embodiment. Each multi-spectra light module 124 may be modular, such that it can be easily removed from and added to any of a plurality of positions in panel 122. This enables multi-spectra light modules 124 to be easily replaced as needed, or panels 122 to be easily reconfigured as needed (e.g., with different types or patterns of multi-spectra light modules 124 for different applications).

As illustrated, each multi-spectra light module 124 may comprise a modular sub-frame 126 with a flower-like mosaic or ring of lights 128 surrounding its center. The center of modular sub-frame 126 may have a diameter $D_1$ (e.g., 10 millimeters) and may itself be a light (e.g., the same as or different than lights 128), may comprise a non-luminating surface or element, or may be empty and/or open (e.g., to allow ambient illumination to pass through the respective panel 122). Each light 128 may have a diameter $D_2$ (e.g., 5 millimeters), may comprise one or more light-emitting diodes (LEDs), and may be removable from modular sub-frame 126, such that each light 128 can be easily replaced or substituted as needed (e.g., to generate a desired light stimulus comprising specific wavelengths). Each light 128 may be configured to emit varying wavelengths of light (e.g., using different LEDs). Alternatively, each light 128 may be configured to emit a single wavelength or range of wavelengths of light, and different lights 128 within the same multi-spectra light module 124 may emit different wavelengths or ranges of wavelengths than each other. In this case, each multi-spectra light module 124 may be configured to emit varying wavelengths of light (e.g., using different lights 128 or combinations of lights 128). In an embodiment, each multi-spectra light module 124 may be configured to emit light with wavelengths in the range of 370 nanometers to 765 nanometers.

The spectrum of illumination across human history has been varied, and ranges from primordial fire to the now ubiquitous LED. Each such historical lighting condition is composed of light of varying wavelengths. Advantageously, the ability of panels 122 to emit light of differing wavelengths enables different lighting conditions to be emulated. For example, solar, halogen, mercury vapor, LED (e.g., white LED), candle light, and incandescent lighting conditions can each be emulated by analyzer 100 controlling the wavelength(s) of light emitted by light source 120. From the warm comforting glow of an incandescent bulb to the harsh cold blue glow of a fluorescent tube, light source 120 may be configured so as to enable analyzer 100 to explore how a subject's visual photosensitivity threshold changes as a function of wavelength.

In an embodiment, light source 120 is modular, such that it can be configured with a virtually infinite combination of LEDs. For example, light source 120 may be configured with LEDs (e.g., using a specific combination and/or arrangement of multi-spectra light modules 124) that are selected to simulate the effect on the subject of using light-filtering eyewear. Sunglasses and corrective eyewear often include chromatic tinting to filter specific wavelengths of light. Thus, light source 120 may be configured to simulate filtered lenses, in order to explore how a subject's visual photosensitivity threshold changes as certain wavelengths are eliminated or attenuated.

In an embodiment, processing system 110 may store (e.g., in main memory 215 and/or secondary memory 220) and/or have access to an integrated spectral database of a plurality of artificial and/or natural light sources. This database may also house a directory of LEDs by vendor, including the wavelength(s) of each LED, the power output of each LED, the angle of each LED, and/or the like. Software executed by processing system 110 may receive a selection of a particular lighting condition to be emulated (e.g., via an input by an operator into the graphical user interface), and suggest a selection and/or configuration of LEDs in the database that can be used to populate light source 120 in order to emulate the selected lighting condition.

Figure 4A:
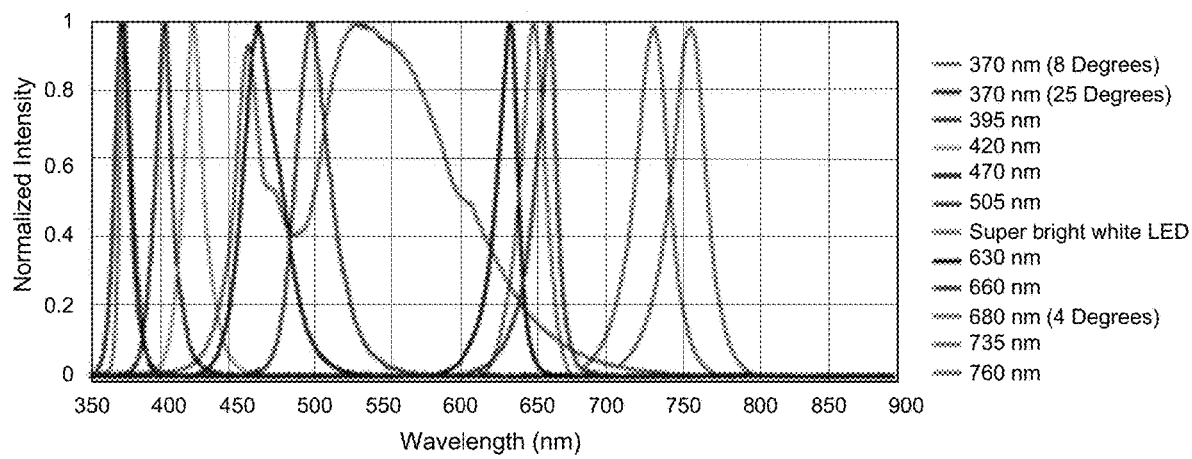
FIGS. 4A and 4B illustrate example wavelengths produced by an ocular photosensitivity analyzer, according to an embodiment.
Figure 4B:
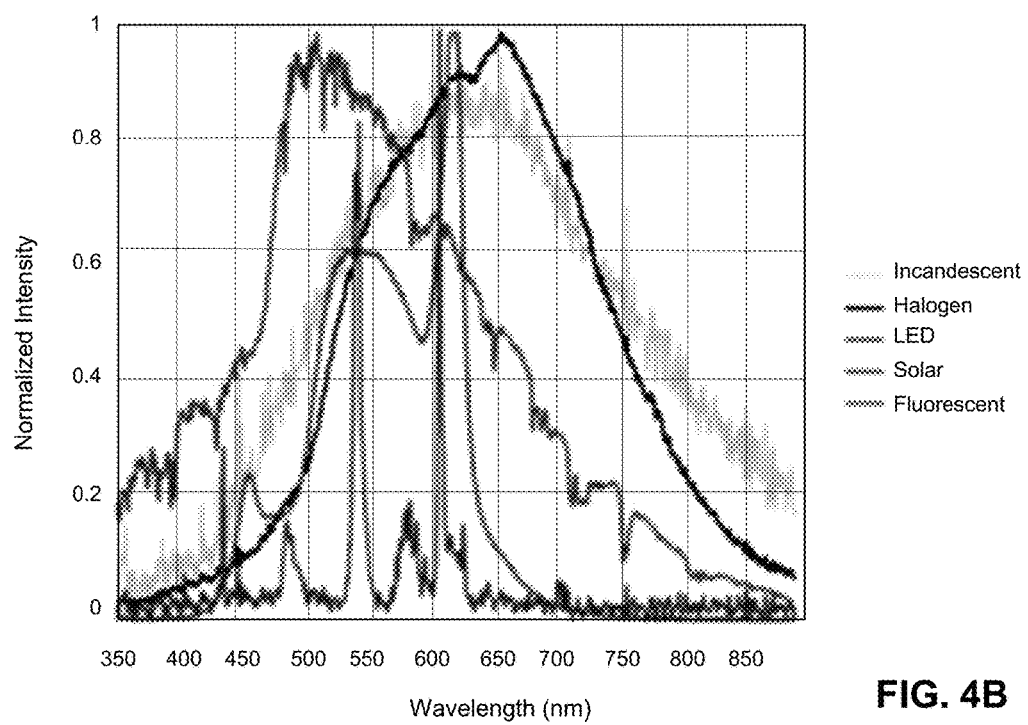

FIG. 4A illustrates an example set of measured LED spectra that light source 120 is configured to produce, and FIG. 4B illustrates a set of lighting conditions that light source 120 is configured to emulate, according to an embodiment. The measurement of visual photosensitivity thresholds of subjects within these emulated lighting conditions can provide an improved understanding of the spectral relationship of visual photosensitivity thresholds and valuable insights into the mechanisms and contributions of different types of photoreceptors to photosensitivity.

For instance, the range of visual light sensitivity and its wavelength dependency varies greatly between subjects. It is unclear how the wavelength of light affects discomfort and pain thresholds for photophobia. The stimuli produced by light source 120, comprising panels 122 with an array of multi-spectra light modules 124 having mosaics of LEDs, covering the visible and/or non-visible light spectrum, can be modulated to emulate distinct lighting environments. Then, the subjects' sensed responses to the stimuli can be analyzed by processing system 110 to help determine the action spectrum for photophobia.

In an embodiment, the spectra of multi-spectra light modules 124 may be individually and/or collectively programmable. For example, processing system 110 may be configured to individually control each multi-spectra light module 124, individually control different subsets of two or more multi-spectra light modules 124, individually control each panel 122, and/or collectively control all of multi-spectra light modules 124 and/or all panels 122, to emit light in one or more specific wavelengths within a range of possible wavelengths.

In an embodiment, light source 120 comprises a frame that houses bi-cupola panels 122. Each panel 122A and 122B in the bi-cupola comprises a mosaic pattern of multi-spectra light modules 124 that are designed to focus light energy on the ocular surface of an eye of a subject. Together, panels 122A and 122B focus light energy on the ocular surfaces of both eyes of the subject. Panels 122 may be modular, such that each panel 122 may be inserted into and removed from the frame as needed (e.g., for replacement or substitution).

1.4. Sensing System

In an embodiment, sensing system 130 may comprise one or more sensors 132. Sensor(s) 132 may comprise one or more cameras 132A, one or more buttons 132B, one or more electromyography (EMG) electrodes 132C, one or more galvanic skin response (GSR) electrodes 132D, and/or one or more other sensors 132E. For example, camera(s) 132A may capture images of a subject's eyes and/or face (e.g., photographs, video comprising a plurality of image frames, etc.), each button 132B may be configured to output a signal indicating whether or not it was pressed, each EMG electrode may output an EMG signal, and each GSR electrode may output a GSR signal. In all cases, the output (e.g., images, signals, etc.) from sensor(s) 132 may be provided to processing system 110 for analysis.

In an embodiment, sensing system 130 comprises one or more high-definition or high-resolution video cameras 132A with telescopic optics. For example, sensing system 130 may comprise at least two such cameras 132A which are each configured (e.g., positioned and angled to focus on a reference point at which a subject's eye is expected to be positioned) to image a different one of the subject's eyes. Additionally or alternatively, sensing system 130 may comprise two near-infrared video cameras that are configured to image a different one of the subject's eyes. Additionally or alternatively, sensing system 130 may comprise a high-definition and/or near-infrared video camera that is configured to capture a full facial image of the subject.

In an embodiment, analyzer 100 comprises at least one camera 132A (e.g., near-infrared video camera) that is configured to image the subject's face. For example, the camera 132A may be fitted with a lens that is capable of imaging the entire width of the subject's face (e.g., when properly positioned by positioning system 140), including both eyes. The subject's face may be imaged simultaneously with imaging of each individual eye of the subject using two separate cameras 132A. For example, in an embodiment, sensing system 130 comprises at least three cameras 132A: a first camera that captures images of the subject's right eye, a second camera that captures images of the subject's left eye, and a third camera that captures images of the subject's full face (e.g., from chin to top of the head and from the left side to the right side). Each of the cameras 132A may be fitted with zoom lenses to adjust the field of view and/or infrared light filters to filter the light stimuli out of the captured images.

1.5. Positioning System

In an embodiment that is well-suited for a clinical setting, analyzer 100 comprises or is interfaced with a positioning system 140 to help appropriately position a subject relative to light source 120, such that light source 120 is focused on regions of interest (e.g., pupils) on the subject's eyes. Positioning system 140 may comprise a stand-alone table unit that supports a chin rest and/or forehead rest. Thus, a subject may place his or her chin in the chin rest and/or place his or her forehead against the forehead rest to appropriately position his or her head. It should be understood that the chin rest and/or forehead rest may be positioned to seat the subject's head, such that the subject's eyes are positioned at or near the focal points of light source 120 (e.g., with each eye at the focal point of a respective one of panels 122).

The chin rest and/or forehead rest may be manually and/or automatically adjustable. In an automatic embodiment, the chin rest and/or forehead rest may be motorized. Processing system 110 may send control signals to positioning system 140 to automatically adjust the chin rest and/or forehead rest to appropriately position a region of interest of the subject (e.g., the pupils of the subject's eyes). The automatic adjustments by processing system 110 may be based on the output of camera(s) 132A received by processing system 110. For example, processing system 110 may be configured to, in real time, continually detect a region(s) of interest (e.g., the subject's eyes) in images output by camera(s) 132A, and control positioning system 140 to adjust the chin rest and/or forehead rest until the region(s) of interest are detected at particular position(s) or within particular region(s) of the images output by camera(s) 132A.

In an embodiment, processing system 110 may execute tracking and auto-centering detection software (e.g., stored in main memory 215 and/or secondary memory 220). This software may automatically and dynamically receive image frames of the subject captured by camera(s) 132A, detect a region of interest (e.g., a set of extracted features) on the subject's face in the received image frames, and control the motorized positioning system 130 to perform micro-adjustments that center the region of interest with respect to camera(s) 132A (i.e., in the image frames captured by camera(s) 132A). Alternatively or additionally, camera(s) 132A could be motorized, and the software could control the motorized camera(s) 132A to center the region of interest with respect to camera(s) 132A. In either case, the software may keep the region of interest centered in the video captured by camera(s) 132A throughout a test. Advantageously, this may increase image quality and reduce variability in the test results.

1.6. Environmental System

In an embodiment that is well-suited for a clinical setting, analyzer 100 comprises or is interfaced with an environmental system 150 to control environmental characteristics of the clinical setting. Specifically, processing system 110 may communicate with environmental system 150 to acquire parameters representing current environmental characteristics and/or set parameters to change environmental characteristics. For example, the environmental characteristics may comprise ambient lighting within the room in which analyzer 100 is operated. In this case, processing system 110 may reduce, increase, and/or otherwise adjust the ambient lighting according to an algorithm (e.g., that may depend on the output of sensing system 130).

Controlling the testing room's ambient illumination can be important for accurate and reproducible testing. Thus, in a particular implementation, environmental system 150 comprises a light source that faces the ceiling, so as to illuminate the room with diffuse light. This diffuse light source, which should not be confused with light source 120, may be integrated with analyzer 100.

In addition, a photometer may be positioned proximal to the subject's eyes (e.g., when the subject is properly positioned, for example, by positioning system 140), to provide feedback to processing system 110 about the intensity level of the ambient illumination reaching the subject's eyes. Thus, processing system 110 may implement a feedback loop that receives the output from the photometer and adjusts the diffuse light source, based on the output from the photometer, until an optimal intensity level of ambient illumination is output by the photometer. In this manner, analyzer 100 can ensure that the test is conducted in a controlled reproducible environment, to thereby reduce test variability.

In an embodiment in which analyzer 100 comprises an integrated room-illumination system as environmental system 150, tests can be conducted with ambient illumination that is fixed in the mesopic range from four (4) to ten (10) lux. Alternatively or additionally, analyzer 100 can control environmental system 150 to adjust the ambient illumination, in order to explore the effects on visual photosensitivity thresholds of ambient illumination that is set to the scotopic and/or photopic ranges. For example, an operator may specify whether a test should be performed in the mesopic, scotopic, or photopic ranges, and processing system 110 may control environmental system 150 to set the ambient illumination in the specified range.

1.7. User Interface

In an embodiment, processing system 110 may generate and/or output one or more graphical user interfaces. For example, analyzer 100 may comprise a display and one or more inputs (e.g., keyboard, pointer device such as a mouse or trackball, etc.) or touch panel display (e.g., a display with an integrated touch sensor to detect operation of a virtual keyboard or other virtual inputs displayed on the display). Processing system 110 may display the graphical user interface on the display and receive and process inputs to the graphical user interface.

In an embodiment, the graphical user interfaces may comprise a first graphical user interface to be used by subjects and a different second graphical user interface to be used by operators of analyzer 100. The first graphical user interface for subjects may comprise one or more virtual buttons 132B or other inputs, instructions for participating in the analysis (e.g., instructions on how to use virtual button(s) 132B), and/or the like. The second graphical user interface for operators may comprise analysis results (e.g., tables, charts, etc.) from tests on subjects, one or more inputs for viewing the analysis results, controls for configuring, initiating, and/or controlling an analysis of a subject, and/or the like.

Figure 5:
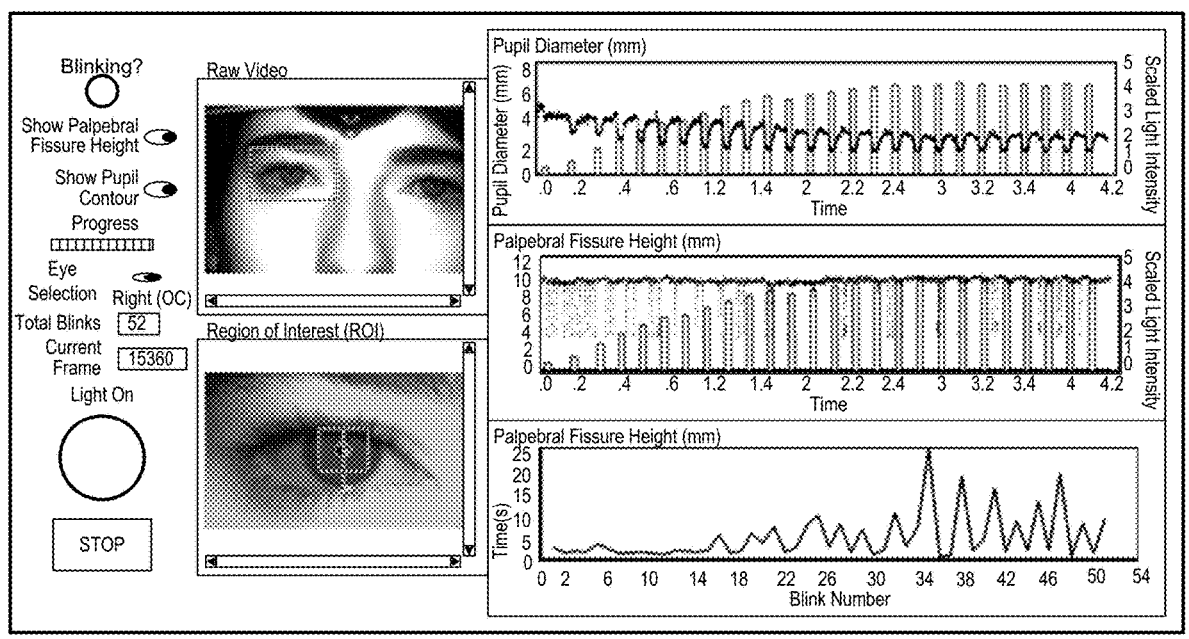
FIG. 5 illustrates a graphical user interface for operators, according to an embodiment.

FIG. 5 illustrates the graphical user interface for operators, according to an embodiment. As illustrated, the graphical user interface may comprise a frame that includes raw video (e.g., video of the subject's face captured by a camera 132A of sensing system 130), video of a region of interest (e.g., video of a selected one of the subject's eyes captured by a camera 132A of sensing system 130), one or more indicators, one or more inputs for selecting settings, and one or more metrics (e.g., physiological metrics) in the form of charts, graphs, or other visual representations. The indicator(s) may comprise an indicator of whether or not the subject is blinking in the current image frame being displayed in the raw video (e.g., an indicator that is on while blinking is detected and off while blinking is not detected), an indicator of whether or not light source 120 is currently activated (e.g., an indicator that is on while light source 120 is activated and off during a rest period in which light source 120 is not activated), and/or the like. The input(s) may comprise a toggle input for selecting whether or not to show palpebral fissure height (e.g., in the raw video and/or video of the region of interest), a toggle input for selecting whether or not to show pupil contour (e.g., in the raw video and/or video of the region of interest), a toggle input for selecting whether to show the right eye or the left eye in the video of the region of interest, a stop input for stopping or pausing the raw video and the video of the region of interest, and/or the like. The metric(s) may comprise a progress bar indicating the duration of the raw video that has been played back relative to the total duration of the raw video, a total number of blinks, the number of the current image frame being displayed in the raw video, a graph of pupil diameter over the duration of the raw video, a graph of palpebral fissure height over the duration of the raw video, a graph of inter-blink intervals over the duration of the raw video, and/or the like.

The graphical user interface could also comprise an eye selection mode for switching between binocular testing (i.e., oculus uterque, or both eyes) and monocular testing (i.e., either oculus dexter or right eye, or oculus sinister or left eye), and/or an input for switching between a testing instruction mode and a testing instruction bypass mode in which testing instructions are omitted for repeat VPT measurements conducted during the same session. In an embodiment, the graphical user interface also comprises an input for capturing a screenshot of the graphical user interface after the analysis is complete. This screenshot can be incorporated into a testing protocol for the purposes of data management.

To aid in the determination of the physiological metrics, sensing system 130 may comprise two near-infrared video cameras 132A that separately record different eyes of the subject. The image frames from each of these dedicated cameras 132A may be analyzed to increase the accuracy in measurements of pupil diameter, palpebral fissure height, inter-blink intervals, and retinal luminance. As discussed above, one or more of these physiological metrics may be visually represented (e.g., as graphs) in the operator's graphical user interface. In addition, processing system 110 may analyze the images to perform extensive modeling of the ocular region of interest, with anthropometric estimations to approximate the required field of view for each eye. These anthropometric estimations may be used to adjust positioning system 140 and/or camera(s) 132A to dynamically maintain region(s) of interest in the center of the field of view of camera(s) 132A.

Pupil diameter, palpebral fissure height, and inter-blink interval can be post-processed and analyzed, at the end of a test session, with custom software developed using the Laboratory Virtual Instrument Engineering Workbench (LabVIEW) platform from NI (formerly National Instruments Corporation), headquartered in Austin, Texas. The software may identify the location of the pupils using the reflection of infrared illumination on the subject's corneas. The software may process a region of interest around this reflection to extract the pupil contour, the upper and lower eyelid contours, and/or the palpebral fissure height.

In an embodiment, processing system 110 may also comprise an audio interface that provides audio instructions and/or questions, in a consistent standardized manner, to each subject. For example, processing system 110 may convert text-based instructions and/or questions into computer-synthesized speech using any well-known text-to-speech software. The computer-synthesized speech may be output by one or more speakers integrated into or connected to processing system 110. Processing system 110 may feature or have access to a customizable language library (e.g., stored in main memory 215 and/or secondary memory 220) that enables it to provide the instructions and/or questions in a plurality of languages (e.g., standard or primary languages for all inhabited continents of the world). It should be understood that the computer-synthesized speech may be produced statically (e.g., prerecorded and stored in main memory 215 and/or secondary memory 220) or dynamically (e.g., generated on demand).

In addition, processing system 110 may have or be connected to one or more microphones which may receive audio spoken by subjects being analyzed. Processing system 110 may convert the received audio into text using any well-known speech-to-text software, and record the text as a subject's response to a light stimulus and/or perform one or more actions based on the text. Again, processing system 110 may feature or have access to a customizable language library that enables it to understand the subjects' responses in a plurality of languages. It should be understood that such a microphone may be considered a sensor 132 of sensing system 130, since it may be used to collect the subject's response to a light stimulus.

Advantageously, the use of computer-synthesized speech to provide instructions and/or questions in a standardized manner and in the subject's natural language—and more generally, the analyzer's control of all interactions with the subject—reduce subjective influences on the subjects. Such influences may include environmental influences, diurnal influences, and the influences of behavioral interactions with analyzer 100 and/or an operator of analyzer 100. By reducing subjective influences, a more objective estimate of each subject's visual photosensitivity threshold may be achieved.

1.8. Infrared Illumination

Illumination of the face may be provided by infrared light from an infrared illumination system comprising a plurality of infrared LEDs. In this case, analyzer 100 may comprise a plurality of infrared LEDs that are positioned, relative to light source 120, to minimize shadows and overcome skin-color absorption. For example, the infrared LEDs may be positioned to precisely aim infrared light at the subject's face (e.g., when properly positioned by positioning system 140), so as not to generate shadows that would obscure behavioral facial responses (e.g., captured by a camera 132A configured to capture the subject's full face) to the light stimuli.

1.9. Frame

In an embodiment, analyzer 100 comprises a frame or housing that supports one or more of the components described herein. For example, the frame may support light source 120, sensing system 130 (e.g., one or a plurality of cameras 132A), positioning system 140, environmental system 150, the infrared illumination system, a fixation light (e.g., a point of light that the subject is instructed to focus his or her eyes upon), and/or the like. The frame may also be fixed or connected to a housing of processing system 110.

2. Process Overview

Embodiments of processes for analyzing ocular photosensitivity will now be described in detail. It should be understood that the described processes may be embodied in one or more software modules that are executed by one or more hardware processors 210 of processing system 110 of analyzer 100. The described processes may be implemented as instructions represented in source code, object code, and/or machine code. These instructions may be executed directly by hardware processor(s) 210, or alternatively, may be executed by a virtual machine operating between the object code and hardware processor(s) 210.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative components, blocks, modules, circuits, and steps are described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a component, block, module, circuit, or step is for ease of description. Specific functions or steps can be moved from one component, block, module, circuit, or step to another without departing from the invention.

Furthermore, while the processes, described herein, are illustrated with a certain arrangement and ordering of subprocesses, each process may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

2.1. Analysis Overview

Figure 6:
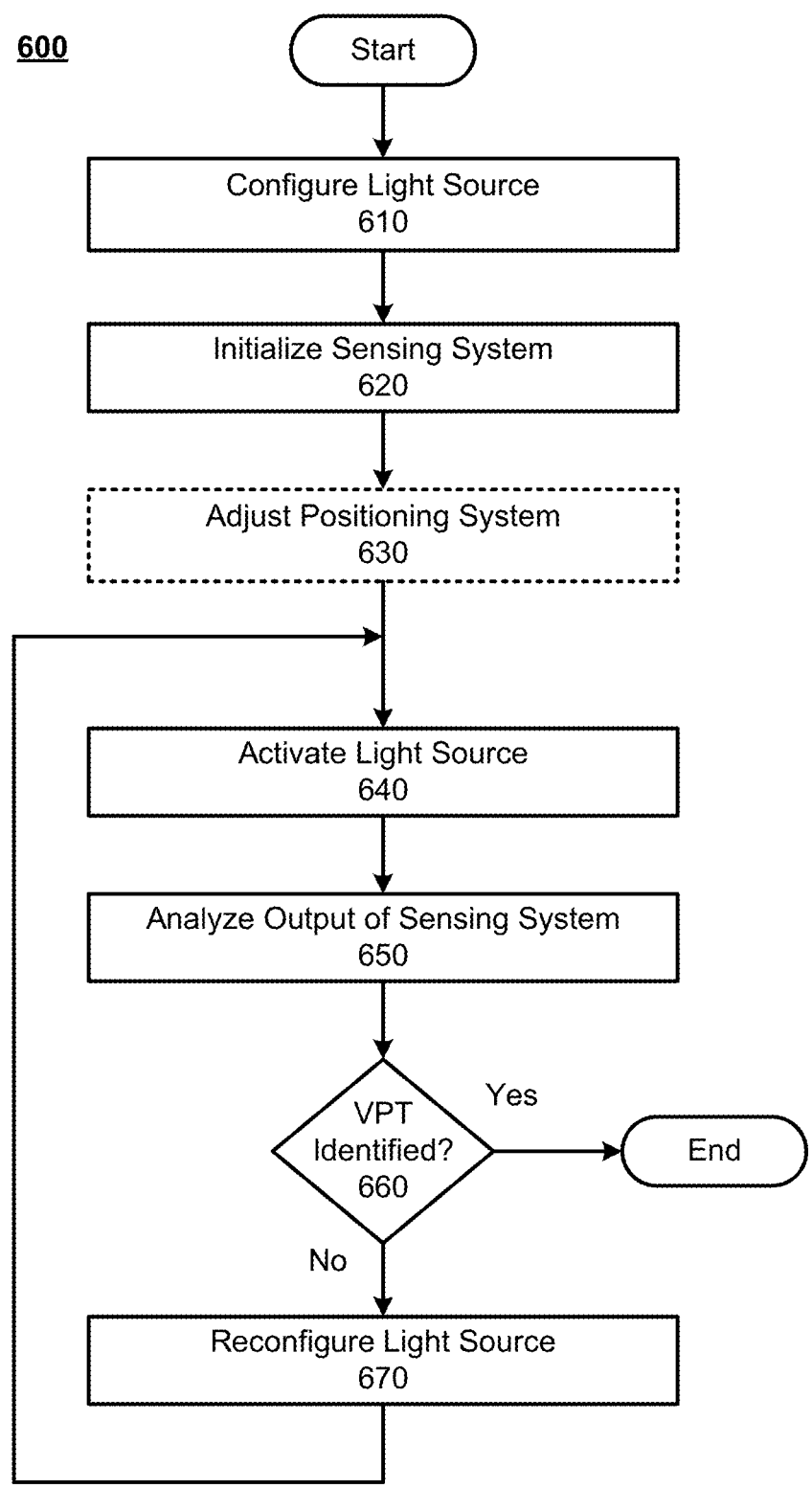
FIG. 6 illustrates a process for analyzing ocular photosensitivity of a subject using an ocular photosensitivity analyzer, according to an embodiment.

FIG. 6 illustrates a process 600 for analyzing ocular photosensitivity of a subject using analyzer 100, according to an embodiment. Process 600 may be implemented as one or more software modules that are persistently stored in secondary memory 220, loaded into main memory 215, and executed by one or more processors 210 of processing system 110.

In subprocess 610, light source 120 may be configured for the subject and/or the particular analytical application. The configuration of light source 120 may comprise setting the spectra (e.g., wavelength or wavelengths) to be emitted by multi-spectra light modules 124 and/or panels 122. Each panel 122 and/or multi-spectra light module 124 may be individually or collectively configured. In an embodiment in which no initial configuration of light source 120 is required, subprocess 610 may be omitted.

In subprocess 620, sensing system 130 may be initialized. The initialization of sensing system 130 may comprise turning on one or more sensors 132, calibrating one or more sensors 132 (e.g., centering a region of interest with respect to cameras 132A, determining a baseline facial expression, determining a baseline EMG and/or GSR signal, etc.), configuring one or more sensors 132, and/or the like. In an embodiment in which no initialization of sensing system 130 is required, subprocess 620 may be omitted.

In subprocess 630, positioning system 140 may be adjusted to properly position the subject's eyes relative to light source 120. This adjustment may comprise moving a chin rest and/or forehead rest under the control of processing system 110, and may be based on the position of the subject's eyes as detected by sensing system 130 (e.g., in images recorded by one or more cameras 132A). In an embodiment in which there is no automated positioning system 140, subprocess 630 may be omitted.

Subprocesses 640-670 may be executed in one or a plurality of iterations depending on the analysis being performed. Initially, in subprocess 640, light source 120 may be activated to emit light towards the subject's eyes. It should be understood that the light that is emitted in subprocess 640 may comprise the wavelength(s) configured in subprocess 610.

Simultaneously with the activation of light source 120 in subprocess 640 or contemporaneously with the activation of light source 120 in subprocess 640 (e.g., within seconds or milliseconds after the activation), the output of sensing system 130 is received and analyzed by processing system 110 in subprocess 650. As discussed elsewhere herein, this output may comprise video or images of the subject's eyes and/or face from one or more cameras 132A, a manual input by the subject (e.g., the pressing of a button 132B), an EMG signal from one or more EMG electrodes 132C attached to the subject, a GSR signal from one or more GSR electrodes 132D attached to the subject, and/or the like. It should be understood that the delay between the activation of light source 120 in subprocess 640 and the reception of the output of sensing system 130 in subprocess 650 may depend on the type of output. For example, a manual input by the subject will generally be output with more delay (e.g., with a magnitude of seconds) than a video or image, EMG signal, or GSR signal, which may be received nearly simultaneously with the activation of light source 120 (e.g., in real time, with a magnitude of milliseconds). Regardless of the type of output, each output generally represents a subject's voluntary or involuntary reaction to the light emitted by light source 120. This output is analyzed to determine whether or not the subject's visual photosensitivity threshold can be identified.

In subprocess 660, it is determined whether or not the subject's visual photosensitivity threshold has been identified from the executed iteration(s) of subprocesses 640 and 650. In an embodiment, the subject's visual photosensitivity threshold may be identified when a confidence value of the estimated visual photosensitivity threshold surpasses a predefined confidence threshold. Alternatively, the subject's visual photosensitivity threshold may be identified as soon as a particular stimuli algorithm has been completed. If the subject's visual photosensitivity threshold is identified (i.e., "Yes" in subprocess 660), process 600 may end.

On the other hand, if the subject's visual photosensitivity threshold has not yet been identified (i.e., "No" in subprocess 660), light source 120 may be reconfigured in subprocess 670, and process 600 may return to subprocess 640 to activate the reconfigured light source 640. In subprocess 670, light source 120 may be reconfigured according to a particular stimuli algorithm, as discussed elsewhere herein.

2.2. Example Features of Stimuli Algorithm

The stimuli algorithm used in subprocess 610 and/or one or more iterations of subprocess 670 to configure light source 120 may utilize all of the following characteristics or any subset and any combination of the following characteristics.

2.2.1. Presentation

In an embodiment, light source 120 may be activated to present the light stimulus episodically. Each episode may comprise light emission at a constant intensity for a time duration (e.g., two seconds). The duration of episodes (e.g., across multiple iterations of subprocess 640) may be adjusted (e.g., increased or decreased) between episodes (e.g., in subprocess 670 between iterations of subprocess 640) according to an algorithm. Between each episode, there may be a rest period (e.g., between iterations of subprocess 640). Each rest period may comprise no light emission for a time duration (e.g., four seconds). The duration of rest periods may be adjusted (e.g., increased or decreased) according to an algorithm. The duration of each episode and/or rest period may be adjusted programmatically through process 600 as a function of the subject's response to the light stimulus, as determined from the output of sensing system 130 (e.g., in subprocess 650).

In an alternative embodiment, the duration of each episode and/or each rest period may be fixed. In this case, the duration of each episode and/or each rest period may be a predefined (e.g., programmed or system) setting or may be manually set by an operator (e.g., prior to process 600 or as part of subprocess 610).

In an embodiment, light source 120 may be activated to present the light stimulus in a ramping pattern. For example, an upward ramping pattern may commence with a period of light emission at a low intensity, followed by periods of light emission at gradually increasing intensities until a maximum intensity is reached. The ramping pattern may be determined according to an algorithm and may be adjusted programmatically throughout process 600 (e.g., in subprocess 670) as a function of the subject's response to the light stimulus, as determined from the output of sensing system 130 (e.g., in subprocess 650).

In an embodiment, light source 120 may be activated to present the light stimulus both episodically and in a ramping pattern across different iterations. For example, the stimuli algorithm may comprise two phases or cycles. In one phase or cycle, the light stimulus may be presented in a ramping pattern, and in a second phase or cycle, the light stimulus may be presented episodically.

2.2.2. Paradigm

In an embodiment, the intensity of the light stimulus may be adjusted according to a single staircase paradigm. For example, the stimuli algorithm may increase and/or decrease the intensity of the light stimulus in stepwise fashion according to an algorithm (e.g., in subprocess 670) which may programmatically adjust the steps as a function of the subject's response to the light stimulus, as determined from the output of sensing system 130 (e.g., in subprocess 650). It should be understood that a typical staircase profile would comprise a light stimulus at a constant first intensity for a first duration, followed by a light stimulus at a constant second intensity (i.e., different than the first intensity) for a second duration (e.g., which may be the same as or different than the first duration), followed by a light stimulus at a constant third intensity (i.e., different than the second intensity) for a third duration (e.g., which may be the same as or different than the first duration and the second duration), and so on and so forth, until completion of the stimuli algorithm.

In an embodiment, the intensity of the light stimulus may be adjusted according to a Bayesian (e.g., dual staircase) or other machine-learning paradigm. Such paradigms behave similarly to the staircase paradigm, but utilize each response to the stimulus (e.g., the output of sensing system 130 analyzed in subprocess 650) to identify the most likely value of the visual photosensitivity threshold. The intensity of the light stimulus corresponding to this most likely value is then selected as the next intensity for the light stimulus (e.g., in subprocess 670).

2.2.3. Step Size

In an embodiment, the step size for each intensity value of the light stimulus is fixed. In other words, the intensity value may be stepped (e.g., increased or decreased across iterations of subprocess 670) by a constant amount.

In an alternative embodiment, the step size for each intensity value of the light stimulus is variable. In other words, the intensity value may be stepped (e.g., increased or decreased across iterations of subprocess 670) by a variable amount. As process 600 progresses through iterations, the step size may decrease. In particular, the reconfiguration in subprocess 670 may adjust the step size based on the output of sensing system 130 in subprocess 650. For example, at the start of process 600 (e.g., initial iterations of loop 640-670), the step size may be large (e.g., at or near a maximum value), and then gradually decreased to smaller and smaller step sizes as process 600 progresses. Stated another way, the stimuli algorithm may start with coarse testing using large step sizes to quickly determine a general range of the subject's visual photosensitivity threshold, and progress to finer testing using gradually decreasing step sizes as the stimuli algorithm converges on the subject's visual photosensitivity threshold.

2.2.4. Pre-Testing

The visual photosensitivity threshold varies from subject to subject. Thus, in an embodiment, the intensity of the initial light stimulus may be set low (e.g., at or near a minimum value) and gradually increased throughout process 600 (e.g., in subprocess 670) as a function of the subject's response to the stimulus (e.g., the output of sensing system 130 analyzed in subprocess 650).

Alternatively, analyzer 100 may perform an initial pre-test that rapidly estimates a subject's visual photosensitivity threshold. Based on this estimated visual photosensitivity threshold, analyzer 100 may then estimate an intensity value for the initial light stimulus and set the initial light stimulus to this estimated intensity value. This pre-test can be coupled with a step size that adjusts as the stimuli algorithm progresses.

2.2.5. Response Reliability

If a subject's visual photosensitivity threshold is to be tracked over time during treatment of the subject, the subject's response reliability to the light stimulus should be assessed. Thus, in an embodiment, each subject's response reliability is assessed utilizing a catch trial.

Additionally or alternatively, in an embodiment, the stimuli algorithm utilizes dual staircases in which one of a pair of different staircases is selected randomly after each response by the subject. Each staircase may progress randomly in order to prevent a subject from detecting the pattern of the light stimuli and anticipating the next light stimulus. It should be understood that each of the dual staircases may comprise a different step pattern (e.g., different sequence of increasing and/or decreasing steps, different stimulus durations and/or rest periods, different step sizes, etc.). Once process 600 is complete, the subject's responses to both staircases (e.g., the outputs of sensing system 130 during each staircase) may be correlated to determine the reliability of the subject's responses to the light stimuli.

2.3. Example Stimuli Algorithm

In an embodiment, the stimuli algorithm, used in subprocess 610 and/or one or more iterations of subprocess 670 to configure light source 120, implements an integrated dual-staircase strategy. This dual-staircase strategy may be combined with a successive approximation detection technique for psychometrically improving the estimation of the visual photosensitivity threshold and increasing the reliability and minimizing the predictability of the stimuli algorithm.

In a particular implementation, the stimuli algorithm and the graphical user interface of analyzer 100 were created as custom software on LabVIEW™. The stimuli algorithm incorporated the QUEST+Bayesian adaptive psychometric testing method, which allows an arbitrary number of stimulus dimensions, psychometric function parameters, and trial outcomes. See Watson, "QUEST+: A general multidimensional Bayesian adaptive psychometric method," Journal of Vision, vol. 17, no. 10, April 2017, doi:10.1167/17.3.10, which is hereby incorporated herein by reference as if set forth in full. In addition, the stimuli algorithm incorporated a randomized dual-staircase response-reversal search algorithm, and an integrated variable stimuli step size that utilized a successive approximation strategy. The response reliability of subjects was improved by using a staircase differential slope analysis, thereby replacing catch trials and reducing the test duration and burden on the subjects. The stimuli algorithm also included a pre-testing phase to define an initial intensity value for the light stimulus.

In an embodiment, the subject's visual photosensitivity threshold is assessed utilizing a subjective paradigm. For example, in a particular implementation, the subject was instructed to press a button 132B whenever the intensity level of the light stimulus caused discomfort to the subject. The visual photosensitivity threshold that corresponded to the intensity level at which the subject pressed button 132B was identified as the subject's visual photosensitivity threshold.

In an alternative embodiment, the subject's visual photosensitivity threshold is assessed utilizing an objective paradigm (e.g., which does not use a button 132B). For example, in a particular implementation, video of the subject's face was analyzed to determine the presence or absence of expressions of discomfort in the subject's face.

In another embodiment, the subject's visual photosensitivity threshold is assessed utilizing a more comprehensive objective paradigm. For example, in a particular implementation, video of the subject's face was analyzed to determine the presence or absence of expressions of discomfort in the subject's face, and EMG and GSR signals from the subject were analyzed to determine the presence or absence of physiological measures of discomfort. This paradigm can produce a more objective quantification of discomfort in subjects than, for example, video alone.

In yet another embodiment, the subject's visual photosensitivity threshold is assessed utilizing a dual subjective and objective paradigm. For example, in a particular implementation, the subject was instructed to press a button 132B when the intensity level of the light stimulus causes discomfort to the subject and video of the subject's face was analyzed to determine the presence or absence of expressions of discomfort in the subject's face. This dual paradigm permits the exploration of the cognitive component of a subject's visual photosensitivity threshold.

2.4. Calibration

In an embodiment, analyzer 100 may comprise or be connected to a spectrometer that measures the light emitted by light source 120. For example, the spectrometer may be placed in one or both of the oculus dexter (O.D., or right eye) position and the oculus sinister (O.S., or left eye) position, in front of light source 120, to detect light at each position. It should be understood that the O.D. and O.S. positions correspond to the positions at which the eyes of a subject are expected to be, when the subject is properly positioned in front of light source 120 (e.g., by positioning system 140).

Processing system 110 may activate light source 120 and receive the output of spectrometer at the time that light source 120 is activated. If the output of the spectrometer indicates that the measured light, which was emitted by light source 120, is not within a predefined range of an expected light stimulus (e.g., in terms of intensity and/or wavelength), processing system 110 may calibrate light source 120 (e.g., adjust intensity and/or wavelength), reactivate light source 120, and reevaluate the output of the spectrometer. Processing system 110 may continue this process over a plurality of iterations to implement a feedback loop to automatically calibrate light source 120 until it emits light within the predefined range of the expected light stimulus. Once light source 120 emits light within the predefined range of the expected light stimulus, processing system 110 may store the calibration parameters for light source 120 that produced the expected light stimulus, for future use.

It should be understood that the entire light source 120 may be calibrated in this manner, each entire panel 122 may be individually calibrated in this manner, each multi-spectra light module 124 may be individually calibrated in this manner, and/or each LED in each multi-spectra light module 124 may be individually calibrated in this manner. In addition, it should be understood that other calibration techniques, including manual calibration techniques, may be utilized.

2.5. Automated Visual Photosensitivity Sensing

In an embodiment, sensing system 130 comprises a camera 132A configured to capture images (e.g., photographs, image frames of a video, etc.) of the face of the subject being analyzed. To ensure that sufficient information about changes in the facial expression of the subject in response to light stimuli is acquired, a high-resolution camera 132A may be used to capture the facial images. As discussed elsewhere herein, this high-resolution camera 132A may be used in combination with two other high-resolution cameras 132A that each capture images of a different eye of the subject. Thus, high-resolution images of both eyes and the entire face of the subject may be simultaneously captured by three high-resolution cameras 132A.

Processing system 110 may activate light source 120 (e.g., in subprocess 640), and receive simultaneous or contemporaneous images (e.g., in subprocess 650) that reflect the subject's response to the light emitted by the activated light source 120. Processing system 110 may then analyze the received images (e.g., in subprocess 650) to determine whether or not discomfort and/or pain are exhibited in the subject's face in the images (e.g., in the form of a grimace). It should be understood that this activation and analysis may be performed over multiple iterations of a light stimulus followed by a corresponding rest period (e.g., of subprocesses 640-670), according to a stimuli algorithm, until the subject's visual photosensitivity threshold has been identified (e.g., in subprocess 660).

In an embodiment, sensing system 130 comprises one or a plurality of EMG electrodes 132C. EMG electrode(s) 132C may be fitted or attached to the subject's face (e.g., near the subject's eyes) to generate and output EMG signals to processing system 110. Processing system 110 may activate light source 120 (e.g., in subprocess 640), and receive simultaneous or contemporaneous EMG signals (e.g., in subprocess 650) that reflect the subject's response to the light emitted by the activated light source 120. Processing system 110 may then analyze the received EMG signals (e.g., in subprocess 650) to determine whether or not discomfort and/or pain are exhibited in the subject's EMG response (e.g., in the form of muscle contraction around the subject's eyes). It should be understood that this activation and analysis may be performed over multiple iterations of a light stimulus followed by a corresponding rest period (e.g., of subprocesses 640-670), according to a stimuli algorithm, until the subject's visual photosensitivity threshold has been identified (e.g., in subprocess 660).

In an embodiment, sensing system 130 comprises one or a plurality of GSR electrodes 132D. GSR electrode(s) 132D may be fitted or attached to the subject (e.g., around the subject's fingers or other body part) to generate and output GSR signals to processing system 110. Processing system 110 may activate light source 120 (e.g., in subprocess 640), and receive simultaneous or contemporaneous GSR signals (e.g., in subprocess 650) that reflect the subject's response to the light emitted by the activated light source 120. Processing system 110 may then analyze the received GSR signals (e.g., in subprocess 650) to determine whether or not discomfort and/or pain are exhibited in the subject's GSR (e.g., in the form of increased sweat gland activity). It should be understood that this activation and analysis may be performed over multiple iterations of a light stimulus followed by a corresponding rest period (e.g., of subprocesses 640-670), according to a stimuli algorithm, until the subject's visual photosensitivity threshold has been identified (e.g., in subprocess 660).

Processing system 110 may utilize any combination of one or more of the images from camera(s) 132A, EMG signals from EMG electrodes 132C, GSR signals from the GSR electrodes 132D, and/or output from other sensors 132 to detect the subject's discomfort and/or pain in response to a light stimulus. For example, processing system 110 may utilize only images, only EMG signals, only GSR signals, a combination of images, EMG signals, and GSR signals, a combination of images and EMG signals, a combination of images and GSR signals, or a combination of EMG signals and GSR signals, to detect the subject's discomfort and/or pain (e.g., in subprocess 650). It should be understood that, in alternative embodiments, processing system 110 could utilize combinations with the outputs of other sensors 132, such as a button 132B that is manually pressed by the subject to indicate his or her response.

In any embodiment, the stimuli algorithm may reconfigure light source 120 (e.g., increase or decrease intensity, change wavelengths, etc.) based on whether or not discomfort and/or pain are detected in the output of sensing system 130. For example, when the stimuli algorithm first detects discomfort, it may reduce the intensity of the light stimulus to more finely identify the intensity value at which comfort turns to discomfort. Similarly, if the stimuli algorithm detects pain before it has detected discomfort, it may reduce the intensity of the light stimulus to identify the intensity value at which comfort turns to discomfort or at which pain recedes to discomfort. It should be understood that the visual photosensitivity threshold for the subject may be determined or derived from the identified intensity value at which discomfort occurs.

Each determination of whether or not discomfort and/or pain are exhibited in a face of a subject in an image, in an EMG signal, and/or in a GSR signal may be performed using a recognition or classification algorithm. In an embodiment, a machine-learning model may be trained to detect discomfort and/or pain from the output of sensing system 130. For example, the machine-learning model may comprise a convolutional neural network that receives an image of a face as an input and classifies the image into one of a plurality of possible classes, including, for example, classes for normal (e.g., no discomfort or pain), discomfort, and pain. Alternatively or additionally, the machine-learning model may comprise another type of machine-learning algorithm that receives a EMG and/or GSR signal as an input and classifies the signal(s) into one of the plurality of possible classes (e.g., normal, discomfort, or pain). The machine-learning model may output a vector comprising, for each possible class, the probability that the output from sensing system 130, whether images and/or signals, falls into that class. Alternatively, the machine-learning model may simply output the class with the highest probability. It should be understood that other types of machine-learning models may be used than those specifically described herein.

In any case, the machine-learning model may be trained, validated, and tested on a dataset that has been annotated or labeled with the classes to which the data belongs. For example, the dataset may comprise a plurality of facial images that are each annotated with the expression (e.g., normal, discomfort, or pain) that the image depicts. Alternatively or additionally, the dataset may comprise a plurality of EMG signals that are each annotated with the class (e.g., normal, discomfort, or pain) that is represented by the EMG signal. Alternatively or additionally, the dataset may comprise a plurality of GSR signals that are each annotated with the class (e.g., normal, discomfort, or pain) that is represented by the GSR signal. It should be understood that, in embodiments which utilize a plurality of these modalities, the dataset may comprise correlated data, such as a plurality of sets of correlated data. Each set of correlated data in the dataset may comprise one or more facial images, EMG signals, GSR signals, button presses, and/or other outputs that all correspond to a single class (e.g., normal, discomfort, or pain) exhibited by a single test subject in response to a light stimulus. Advantageously, the utilization of a plurality of input modalities for the classification may provide a more robust classifier and enables the investigation of interactions between physiological and psychological components of the visual photosensitivity threshold.

Advantageously, the quantification of physical facial changes, including ocular changes, using a machine-learning model or other artificial intelligence (AI), provides an objective measure of each subject's visual photosensitivity threshold. In particular, the use of artificial intelligence enables discomfort and/or pain to be objectively detected in a subject, and the detection of discomfort and/or pain can be correlated with the light intensity that caused the discomfort and/or pain. It should be understood that the visual photosensitivity threshold, corresponding to this correlated light intensity, may be identified as the visual photosensitivity threshold of the subject.

In a particular implementation, sensing system 130 comprises a near-infrared video camera 132A that captures a full facial video of the subject. Processing system 110 extracts facial features and cues from the image frames of the video, and analyzes these features and cues to classify them into one of a plurality of classes, including, for example, discomfort and pain. The extraction and analysis may be performed by software produced by FaceX, LLC of Iowa City, Iowa, to produce a comprehensive measure of each subject's visual photosensitivity threshold. Specifically, automated feature extraction may be applied to each image frame in the video, and the extracted features may be analyzed to derive facial action unit (FAU) activity for each group of muscles in the subject's face for each of a plurality of points in time and for each intensity level in the light stimuli. The analyzed muscle groups may include, without limitation, the procerus, corrugator, orbicularis oculi, orbicularis oris, and iris/pupil muscles. The dynamics of the facial action units for each muscle group, as a function of time and light intensity, can be correlated with VPT measurements to determine the objective set of facial action units representing predicted discomfort and/or pain in subjects. This set of facial action units may then be used in the future to objectively determine the intensity level at which subjects experience discomfort and/or pain.

3. VPT Measures

In an embodiment, the visual photosensitivity threshold may comprise a plurality of visual photosensitivity threshold measures. For example, the plurality of VPT measures may comprise both a discomfort measure and a pain measure. In prior studies, subjects were instructed to respond (e.g., press a button 132B) when the light intensity became "uncomfortable." However, many subjects reported confusion about what the term "uncomfortable" meant. The inventors hypothesized that subjects interpreted the term "uncomfortable" to mean some light intensity that was between "annoying" and "painful."

Accordingly, in an embodiment, the subjects may be instructed to respond (e.g., press a button 132B) when the light intensity becomes "annoying" or "uncomfortable" and separately respond (e.g., press a button 132B) when the light intensity becomes "painful." The light intensity that the subject's response indicates is "annoying" or "uncomfortable" may be used as or to derive the discomfort VPT measure, and the light intensity that the subject's response indicates is "painful" may be used as or to derive the pain VPT measure.

By utilizing a plurality of different VPT measures, the subjects can be more accurately instructed. In addition, multiple clinical outcome measures can be obtained that enable exploration of varying levels of discomfort, from the innocuous to the severe.

4. Variations in Subjects

Naturally, the traits of the subjects to be analyzed by analyzer 100 will vary. For example, many facial and ocular anatomical variations are linked to the age, weight, and height of the subjects. To address these variations, light source 120 and cameras 132 of sensing system 130 should be configured (e.g., sized and positioned) to have a sufficient field of view and range to assess the visual photosensitivity threshold of any subject positioned (e.g., according to a reference point, such as a chin rest of positioning system 140) within analyzer 100.

5. Portable Embodiment

In an embodiment, analyzer 100 may be a portable and compact apparatus for reliably quantifying the visual photosensitivity thresholds of subjects. For example, all of the components of analyzer 100 may be comprised in a cart with wheels that can be rolled from room to room. Alternatively, the components of analyzer 100 may be comprised in a wearable device, such as smart glasses with light source 120 and/or sensing system 130 built into the lenses or frame. In this case, the frame of the smart glasses essentially acts as a positioning system that properly positions light source 120 and sensing system 130 relative to the subject's eyes and face. For example, light source 120 may be integrated into the frame such that, when the smart glasses are worn by a subject, light source 120 is focused on the subject's eyes. Similarly, camera(s) 132A may be integrated into the frame such that, when the smart glasses are worn by the subject, camera(s) 132A are focused on the subject's eyes and/or face. EMG electrodes 132C and/or GSR electrodes 132D could also be integrated into or connected to the frame so as to contact appropriate positions on the subject's face when the smart glasses are worn by the subject. One or more button(s) 132B could also be integrated into the frame, for example, on the outside of the frame so that button(s) 132B can be pressed while the smart glasses are worn. Processing system 110, along with connections to the various other components (e.g., light source 120 and/or sensing system 130) may also be integrated into (e.g., enclosed) within the frame. A wearable embodiment should also include a battery (e.g., rechargeable battery) to power the components of analyzer 100 without the need for a wired connection.

In a wearable embodiment, analyzer 100 may enable immersive, real-time, spectral monitoring of a subject's visual photosensitivity. This monitoring can be performed throughout the course of a normal day for the subject, as the subject interacts with his or her actual and natural environment. This may be especially useful for athletes or soldiers. For example, a subject may wear analyzer 100 (e.g., as smart glasses, integrated into a helmet, etc.) in the field (e.g., while practicing or competing in football, hockey, etc., during military exercises or deployment, etc.), and analyzer 100 may be monitor the subject to test for concussions. Analyzer 100 may determine that the subject is experiencing a concussion when an increase in the subject's visual photosensitivity threshold exceeds a threshold amount.

In a wearable embodiment, analyzer 100 may continuously or periodically monitor the subject's visual photosensitivity threshold. For example, processing system 110 may execute process 600 continuously or at periodic intervals. Alternatively, analyzer 100 may measure the subject's visual photosensitivity threshold in response to a notification or trigger. For example, processing system 110 may receive a notification (e.g., via transmission over a wireless network) or trigger (e.g., via an event handler, executed by processor 210 of processing system 110, to monitor events within analyzer 100), and responsively execute process 600 to identify the subject's current visual photosensitivity threshold.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. An ocular photosensitivity analyzer comprising:
   at least one hardware processor;
   a programmable light source comprising a plurality of multi-spectra light modules configured to emit light at a range of wavelengths;
   a sensing system comprising one or more sensors; and
   one or more software modules that are configured to, when executed by the at least one hardware processor,
      receive an indication of a lighting condition comprising one or more wavelengths of light,
      configure the programmable light source to emit light according to the lighting condition, and,
      for each of one or more iterations,
         activate the programmable light source to emit the light according to the lighting condition,
         collect a response, by a subject, to the emitted light via the sensing system, and
         after collecting the response, analyze the response to determine whether or not the response represents discomfort or pain, wherein analyzing the response comprises applying a machine-learning algorithm, which has been trained to classify responses according to a plurality of classes, to the response to classify the response into one of the plurality of classes, wherein the plurality of classes comprises one or both of a class representing discomfort or a class representing pain.

2. The ocular photosensitivity analyzer of claim 1, wherein the programmable light source comprises two cupola-shaped panels, wherein each of the two cupola-shaped panels comprises a subset of the plurality of multi-spectra light modules, and wherein the subset of multi-spectra light modules in each of the two cupola-shaped panels is concavely arranged to focus the emitted light on a focal point.

3. The ocular photosensitivity analyzer of claim 1, wherein each of the multi-spectra light modules is modular such that the multi-spectra light module can be inserted at and removed from any of a plurality of positions within the programmable light source.

4. The ocular photosensitivity analyzer of claim 1, wherein each of the multi-spectral light modules comprises a ring of lights around a center, and wherein each of the lights comprises one or more light-emitting diodes.

5. The ocular photosensitivity analyzer of claim 1, wherein the one or more sensors comprise at least one high-definition camera that is configured to capture images of a face of the subject, and wherein collecting the response comprises receiving the images captured by the at least one high-definition camera during a time period that includes or follows a time at which the programmable light source was activated.

6. An ocular photosensitivity analyzer comprising:
   at least one hardware processor;
   a programmable light source comprising a plurality of multi-spectra light modules configured to emit light at a range of wavelengths;
   a sensing system comprising one or more sensors, wherein the one or more sensors comprise at least three high-definition cameras, wherein the at least three high-definition cameras comprise a first high-definition camera configured to capture images of a face of a subject, a second high-definition camera configured to capture images of a right eye of the subject, and a third high-definition camera configured to capture images of a left eye of the subject; and
   one or more software modules that are configured to, when executed by the at least one hardware processor,
      receive an indication of a lighting condition comprising one or more wavelengths of light,
      configure the programmable light source to emit light according to the lighting condition, and,
      for each of one or more iterations,
         activate the programmable light source to emit the light according to the lighting condition, and
         collect a response, by the subject, to the emitted light via the sensing system, wherein collecting the response comprises receiving the images captured by the at least three high-definition cameras during a time period that includes or follows a time at which the programmable light source was activated.

7. The ocular photosensitivity analyzer of claim 1, wherein the one or more sensors comprise a button that outputs a signal indicating when the button has been pressed.

8. The ocular photosensitivity analyzer of claim 1, wherein the one or more sensors comprise one or more electromyography (EMG) sensors that are each configured to output an EMG signal from one or more muscle groups of the subject.

9. The ocular photosensitivity analyzer of claim 1, wherein the one or more sensors comprise one or more galvanic skin response (GSR) sensors that are each configured to output a GSR signal from the subject.

10. An ocular photosensitivity analyzer comprising:
    at least one hardware processor;
    a programmable light source comprising a plurality of multi-spectra light modules configured to emit light at a range of wavelengths;
    a sensing system comprising one or more sensors; and
    one or more software modules that are configured to, when executed by the at least one hardware processor,
       receive an indication of a lighting condition comprising one or more wavelengths of light,
       configure the programmable light source to emit light according to the lighting condition, and,
       for each of one or more iterations,
          activate the programmable light source to emit the light according to the lighting condition,
          collect a response, by a subject, to the emitted light via the sensing system, and when determining that the response does not represent discomfort or pain, reconfiguring the programmable light source to emit the light at a higher intensity, and adding a new iteration to the one or more iterations.

11. The ocular photosensitivity analyzer of claim 1, wherein the one or more iterations are a plurality of iterations, and wherein the one or more software modules are further configured to:
for each of the plurality of iterations,
after collecting the response, analyze the response, and reconfigure the programmable light source based on the analysis and a stimuli algorithm; and
determine a visual photosensitivity threshold of the subject based on the analysis in at least a last one of the plurality of iterations.

12. The ocular photosensitivity analyzer of claim 11, wherein the stimuli algorithm implements a staircase such that, in each of the plurality of iterations, reconfiguring the programmable light source comprises adjusting an intensity of the light to be emitted by the programmable light source by a step size from the intensity of the light most recently emitted by the programmable light source.

13. An ocular photosensitivity analyzer comprising:
at least one hardware processor;
a programmable light source comprising a plurality of multi-spectra light modules configured to emit light at a range of wavelengths;
a sensing system comprising one or more sensors; and
one or more software modules that are configured to, when executed by the at least one hardware processor,
receive an indication of a lighting condition comprising one or more wavelengths of light,
configure the programmable light source to emit light according to the lighting condition,
for each of a plurality of iterations,
activate the programmable light source to emit the light according to the lighting condition,
collect a response, by a subject, to the emitted light via the sensing system,
after collecting the response, analyze the response, and
reconfigure the programmable light source based on the analysis and a stimuli algorithm, wherein the stimuli algorithm implements a staircase such that, in each of the plurality of iterations, reconfiguring the programmable light source comprises adjusting an intensity of the light to be emitted by the programmable light source by a step size from the intensity of the light most recently emitted by the programmable light source, and wherein the stimuli algorithm comprises adjusting the step size based on the collected responses, and
determine a visual photosensitivity threshold of the subject based on the analysis in at least a last one of the plurality of iterations.

14. The ocular photosensitivity analyzer of claim 1, further comprising a positioning system comprising one or both of a chin rest and a forehead rest, wherein the positioning system is positioned relative to the programmable light source to seat a head of the subject such that each eye of the subject is positioned at a focal point of the programmable light source.

15. An ocular photosensitivity analyzer comprising:
at least one hardware processor;
a programmable light source comprising a plurality of multi-spectra light modules configured to emit light at a range of wavelengths;
a sensing system comprising one or more sensors, wherein the sensing system comprises at least one camera configured to capture images;
a positioning system comprising one or both of a chin rest and a forehead rest, wherein the positioning system is positioned relative to the programmable light source to seat a head of a subject such that each eye of the subject is positioned at a focal point of the programmable light source, and wherein the positioning system is motorized; and
one or more software modules that are configured to, when executed by the at least one hardware processor,
in real time, analyze the images captured by the at least one camera to detect a region of interest of the subject in the images, and control one or more motors of the positioning system to center the region of interest within the images captured by the at least one camera,
receive an indication of a lighting condition comprising one or more wavelengths of light,
configure the programmable light source to emit light according to the lighting condition, and,
for each of one or more iterations,
activate the programmable light source to emit the light according to the lighting condition, and
collect a response, by the subject, to the emitted light via the sensing system.

16. An ocular photosensitivity analyzer comprising:
at least one hardware processor;
a programmable light source comprising a plurality of multi-spectra light modules configured to emit light at a range of wavelengths;
a sensing system comprising one or more sensors;
an interface with an environmental system comprising one or more ambient light sources; and
one or more software modules that are configured to, when executed by the at least one hardware processor,
receive an indication of one of a plurality of illumination ranges via a graphical user interface,
control the one or more ambient light sources via the interface to maintain ambient illumination from the one or more ambient light sources within the indicated illumination range,
receive an indication of a lighting condition comprising one or more wavelengths of light,
configure the programmable light source to emit light according to the lighting condition, and,
for each of one or more iterations,
activate the programmable light source to emit the light according to the lighting condition, and
collect a response, by a subject, to the emitted light via the sensing system.

17. The ocular photosensitivity analyzer of claim 1, further comprising an infrared light source configured to aim infrared light at a face of the subject.

18. A method in an ocular photosensitivity analyzer that comprises a programmable light source comprising a plurality of multi-spectra light modules configured to emit light at a range of wavelengths, a sensing system comprising one or more sensors, and at least one hardware processor, wherein the method comprises using the at least one hardware processor to:
receive an indication of a lighting condition comprising one or more wavelengths of light;

configure the programmable light source to emit light according to the lighting condition; and, for each of one or more iterations, activate the programmable light source to emit the light according to the lighting condition, collect a response, by a subject, to the emitted light via the sensing system, and after collecting the response, analyze the response to determine whether or not the response represents discomfort or pain, wherein analyzing the response comprises applying a machine-learning algorithm, which has been trained to classify responses according to a plurality of classes, to the response to classify the response into one of the plurality of classes, wherein the plurality of classes comprises one or both of a class representing discomfort or a class representing pain.

* * * * *